Aug. 12, 1958  L. A. RICE  2,847,530
CENTRIFUGAL SWITCH
Filed Oct. 24, 1955

INVENTOR.
LYMAN A. RICE
BY John A. Marvin
ATTORNEY

United States Patent Office 2,847,530
Patented Aug. 12, 1958

2,847,530

CENTRIFUGAL SWITCH

Lyman A. Rice, Anderson, Ind., assignor to General Motors Corporation, Detroit, Mich., a corporation of Delaware Application October 24, 1955, Serial No. 542,370

11 Claims. (Cl. 200—80)

This invention relates to centrifugal switches and more particularly to centrifugal switches of the snap acting variety which may be included in a machine to control an electric circuit in accordance with the rotational speed and temperature of the machine.

One of the objects of the present invention is to include a snap acting centrifugal switch in a machine to control a circuit when the rotational speed of the machine exceeds a predetermined value.

A further object of the present invention is to include a snap acting temperature responsive centrifugal switch in a machine to control an electric circuit when the rotational speed or temperature or combinations thereof exceed a predetermined value.

Another object of the present invention is to include a centrifugally responsive snap acting spring blade type switch in a dynamoelectric machine and to provide the switch with a means for causing the switch contacts to open when the machine is not rotating, to close the contacts with a snap action after the machine is rotating at a predetermined speed and also to include a means in the switch which will increase the engaging pressure between the contacts after the speed of rotation of said machine exceeds said predetermined value.

While the switch, according to the present invention, may be used with any type of dynamoelectric unit, it is particularly suited for use with an alternator that is installed in a motor vehicle battery charging system as disclosed in application, Serial No. 498,966, assigned by the inventors to the assignee of the present invention. When the switch is used in this environment, it will control the circuits to the cutout relay and the alternator field. The switch, according to the present invention, will have an improved operation over the conventional types of switches which have been heretofore included in dynamoelectric units when these units are installed in a motor vehicle. It is well known that dynamoelectric units in motor vehicles are subject to extreme vibrations as caused by road shock and other causes. This vibration will cause the conventional switch contacts to close when they should remain open and to open when they should be closed, and, thus, cause pitting or erosion of the switch contacts and produce a very erratic alternator operation which is detrimental to the rectifier and other parts of the vehicle's electrical system. The switch, according to the present invention, when used in an alternator, because of its snap acting action and the other means associated therewith, will maintain the contacts either fully open or closed as required and will increase the pressure engagement between the closed contacts when the speed of the alternator increases.

Further objects and advantages of the present invention will be apparent from the following description, reference being had to the accompanying drawings wherein preferred embodiments of the present invention are clearly shown.

Figure 1:
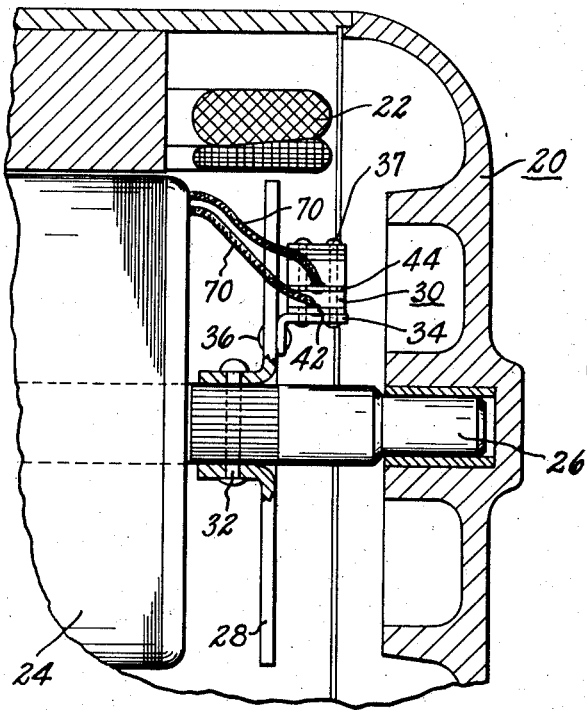
Figure 1 is a cross-sectional view of a dynamo-electric unit with a snap acting centrifugally responsive switch according to the present invention mounted therein.

In the drawings, the numeral 20 is used to designate a dynamoelectric machine which may be either an AC or DC motor or generator. In the embodiment shown, the AC generator is provided with stator windings 22 and rotor windings 24 which preferably constitute the field for the unit. Units of the type herein shown generally have a rotating shaft 26 whereon the rotor windings 24 are secured.

Secured to shaft 26 is a disc 28 which carries a switch 30. The disc 28 may be secured to the shaft in any conventional manner and, in the embodiment shown, is held in position by a rivet 32.

Figure 2:
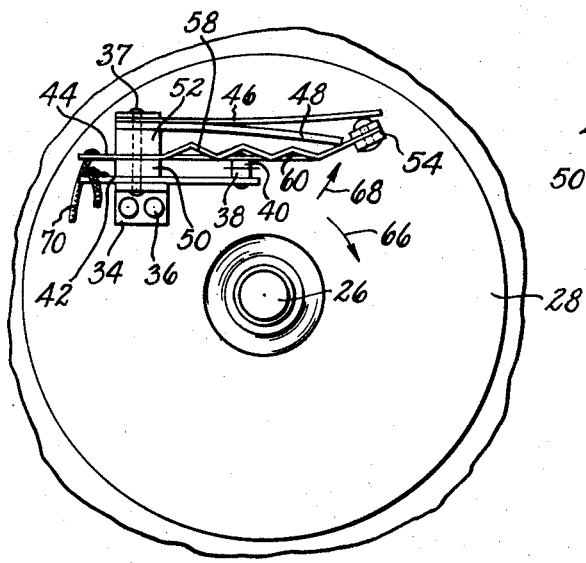
Figure 2 is an end view of the switch in Figure 1 with the switch contacts as closed when the unit is rotating.
Figure 3:
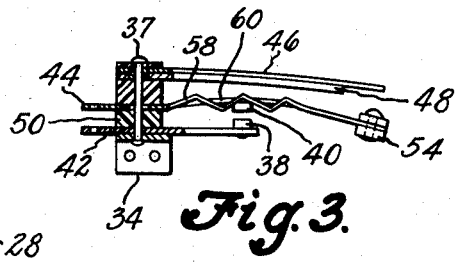
Figure 3 is a view of the switch according to the present invention with the contacts in the normal and open position.

The switch 30 is provided with a support 34 secured to disc 28 by rivets 36. The support 34 carries a laminated assembly, most clearly seen in Figure 3, spaced from disc 28 and secured, as shown in Figures 2 and 3, to the support 34 by rivets 37. The assembly includes a stationary contact 38 and a movable contact 40. The stationary contact 38 is carried on a free end of an arm 42 and the movable contact 40 is carried on a spring blade 44. The arm 42 and blade 44 each have terminal portions integrally formed thereon which may be connected with the field windings by leads 70. The assembly also includes a spring blade 46 and a stop 48. The arm 42 and spring blade 44 are insulated from each other by an insulating part 50. The spring blade 46 and the stop 48 are insulated from spring blade 44 by insulating part 52. In Figure 3, a weight 54 is shown as secured to the free end of the spring blade 44. The spring blade 44 is designed to have a snap action and is formed of a unitary part to have two longitudinally extending slots 56 therein forming two outer legs 58 and a central leg 60. The outer legs 58 each have a series of crimps formed in the central portion thereof to effectively reduce the length of said outer legs 58 and to apply a compressive stress to the center leg 60. Thus, when the fixed end 62 of the blade member 44 is secured to the support 34 and the free end portion 64, whereon weight 54 is carried, is moved, the stressed portion 60 will move with a snap action over the center line of the blade member 44 and cause contact 40 to rapidly engage or become separated from the stationary contact 38.

In Figure 3, the switch parts are shown in a normal position, that is, when the shaft 26 and the disc 28 whereon the switch part is carried, is at rest or is rotating at less than a predetermined speed. After the disc 28 is caused to rotate at a speed greater than a predetermined value, in the direction of arrow 66, the centrifugal force, as represented by arrow 68, will cause the weight 54 to move radially outwardly relative to the axis of the shaft 26. This movement of weight 54 will cause the free end 64 portion of the spring blade or leaf spring 44 to move radially outwardly or upwardly as in Figure 2 and cause the stressed portion 60 to move downwardly over the center line of the leaf member 44 so that contacts 40 and 38 engage each other with a snap action. As the centrifugal force 68 is increased by a further increase of rotation of the shaft 26 above the speed of rotation which will cause the initial snap acting movement of contact 40, the spring blade 46 will be engaged by weight 54 which will oppose the further outward movement of spring blade 44. The spring blade 46 is arranged relative to the blade 44 so that when the speed of rotation of shaft 26 is less than a predetermined value, spring blade 46 will force weight 54 and the leaf spring blade 44 downwardly to cause the contacts 38 and 40 to open. In Figure 2, it is apparent that as the weight 54 engages spring blade 46, the end of the stop member 48 will engage the spring blade 44 in the area intermediate the weight 54 and the movable contact 40. When the stop member 48 thus engages the blade 44, it will act as a fulcrum and cause the engagement pressure between contacts 40 and 38 to be increased and the contacts will remain closed and be uneffected by vibrations of the dynamoelectric unit 20.

In Figure 1 of the drawings, the field windings of the rotor 24 are shown as connected through leads 70 to the switch parts which include the extending portions integrally formed on the spring blade 44 and the stationary contact arm 42. This field, if desired, may be a bucking field winding for the alternator and is normally disconnected when the alternator is rotating at less than a predetermined speed as when contacts 40 and 38 are open. When, however, the speed of rotation of the alternator 20 exceeds a predetermined value, contacts 40 and 38 will close because of the action of centrifugal force on weight 54. When these contacts close, the field associated with leads 70 will be energized to limit the output of the alternator at higher speeds.

From the above, it is apparent that the switch, according to the present invention, may be mounted in any suitable dynamoelectric unit in a circuit that is either external or internal of the unit to control the energization of the circuit when the dynamoelectric unit reaches a predetermined speed. Further, if desired, the contacts 38 and 40 may be normally closed and may be caused to open at a predetermined speed if various switch parts are suitably arranged to accomplish this result. The calibration of the switch so that it will be responsive to a predetermined centrifugal force may be accomplished by adjusting the location or the size of the weight, the strength of the spring 44 or the amount of crimping that is formed on portions 58.

Figure 5:
Figure 5 is a side view of the spring blade in Figure 4 as formed of bimetal stock.
Figure 4:
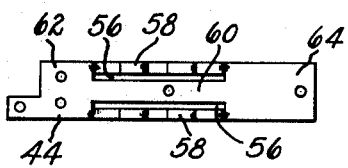
Figure 4 is a plan view of a snap acting spring blade as used in the switch in Figure 3.

Another feature which is comprehended by the present invention is to form the leaf spring 44 of bimetal stock as shown in Figure 5 as is well known and set forth in the U. S. patent to Woodman 2,363,376. When the leaf spring 44 is formed of this material, its calibration will change with variations in the temperature of the dynamoelectric unit so that it can be utilized as an overload protective device. Thus, if the materials of the bimetal are properly selected, an increase in temperature will decrease the resistance of the leaf spring to movement by centrifugal force and thus the bucking field of the alternator may be cut in at a lower speed of rotation than would be the case if the alternator was operating at a lower temperature. Manifestly, bimetal snap acting centrifugally responsive switches may be used in other circuits than the circuit indicated.

While the embodiments of the present invention as herein disclosed constitute preferred forms, it is to be understood that other forms might be adopted.

What is claimed is as follows:

1. In combination with a dynamoelectric unit, a centrifugally responsive snap acting switch for controlling an electric circuit in response to the speed of rotation of said unit, comprising; a support carried by a rotatable part of said unit, a spring blade carried by said support and rotatable with said unit, a stationary contact carried by said support, a snap acting spring blade carried by said support and responsive to the speed of rotation of said unit, a movable contact carried by said snap acting blade and movable with a snap action into engagement with the stationary contact when the speed of rotation of said unit exceeds a predetermined value, a means carried by said support for causing the blade to move the movable contact out of engagement with said stationary contact when speed of rotation of said unit is less than said predetermined value, and a means for causing the engagement pressure between said contacts to increase when the speed of rotation of said unit exceeds said predetermined value.

2. A centrifugally responsive snap acting switch adapted to be used with a dynamoelectric unit for controlling an electric circuit in response to the speed of rotation of said unit, comprising; a support carried by a rotatable part of said unit, a spring blade carried by said support and rotatable with said unit, a stationary contact carried by said support, a snap acting spring blade carried by said support, and responsive to the speed of rotation of said unit, a movable contact carried by said blade and movable with a snap action into engagement with the stationary contact when the speed of rotation of said unit exceeds a predetermined value, a means carried by said support for causing the blade to move the movable contact out of engagement with said stationary contact when speed of rotation of said unit is less than said predetermined value, and a means for causing the engagement pressure between said contacts to increase when the speed of rotation of said unit exceeds said predetermined value.

3. In combination with a rotatable device, a centrifugally responsive snap acting switch for controlling an electric circuit in response to the rotation of said unit, comprising; a support mountable on a rotating part of said unit, a centrifugally responsive snap acting member carried by said support, a movable contact carried by said member movable with a snap action into engagement with a stationary contact carried by said support when the rotation of said unit exceeds a predetermined value, and a means for increasing the engagement pressure between said contacts when the unit rotation exceeds said predetermined value.

4. A centrifugally responsive snap acting switch adapted to be used with a dynamoelectric unit for controlling an electric circuit in response to the speed of rotation of said unit, comprising; a support mountable on a rotating part of said unit, a centrifugally responsive snap acting member carried by said support, a movable contact carried by said member movable with a snap action into engagement with a stationary contact carried by said support when the rotation of said unit exceeds said predetermined value, and a means for increasing the engagement pressure between said contacts when the unit rotation exceeds said predetermined value.

5. In combination with a dynamoelectric unit, a centrifugally responsive snap acting switch device for controlling an electric circuit in response to the speed of rotation of said unit, comprising; a support mountable on a rotatable part of said unit, a centrifugally responsive snap acting means mountable on said support, a stationary contact carried by said support, a movable contact carried by said snap acting means and movable with a snap action into engagement with said stationary contact when the rotation of said unit exceeds a predetermined value, a means for increasing the engagement pressure between said contacts when the unit rotation exceeds said predetermined value, and a means for limiting the movement of said snap acting means when the rotation of said suit exceeds said predetermined value.

6. A centrifugally responsive snap acting switch adapted to be used with a dynamoelectric unit for controlling an electric circuit in response to the speed of rotation of said unit, comprising; a support mountable on a rotatable part of said unit, a centrifugally responsive snap acting means mountable on said support, a stationary contact carried by said support, a movable contact carried by said snap acting means and movable with a snap action into engagement with said stationary contact when the rotation of said unit exceeds a predetermined value, a means for increasing the engagement pressure between said contacts when the unit rotation exceeds said predetermined value, and a means for limiting the movement of said snap acting means when the rotation of said unit exceeds said predetermined value.

7. A centrifugally actuated switch capable of a snap acting movement for use in a dynamoelectric machine, comprising; a support mountable on a part of the machine which rotates about an axis, a stationary contact carried by said support, a unitary snap acting spring flexible blade member spaced from the axis of rotation of said part and carried by said support, said snap acting member having; a free end portion spaced from said support, a snap acting portion between said free end and support arranged to move with a snap over center action when the blade member is flexed and the free end of said blade member is moved relative to said support, a weight member carried by the free end of said blade member for causing said blade member to flex in response to centrifugal force created by the rotation of said part, a movable contact carried by the snap acting portion of said blade member normally separated from said stationary contact and arranged to move into engagement therewith when the centrifugal force on said weight exceeds a predetermined value and causes the blade member to flex and move the snap acting portion, a second spring blade member carried by said support and engageable by said snap acting spring blade member for opposing the flexing of said snap acting blade member in response to centrifugal force on said weight and for causing said snap acting member to flex and move the snap acting portion when the centrifugal force on said weight is less than said predetermined value for separating said contacts, and a means carried by said support for causing the pressure engagement between the contacts to increase when the centrifugal force on said weight exceeds a predetermined value.

8. In combination with a dynamoelectric unit, a temperature responsive snap acting device responsive to centrifugal force for controlling an electric circuit in response to the speed of rotation of said unit, comprising; a support rotatable with said unit, a centrifugally responsive bimetallic means cantileverly mounted on said support and rotatable with said unit, a movable contact carried by said means movable into engagement with a stationary contact when the speed of rotation and temperature of said unit exceeds a predetermined value, and means connected with said bi-metallic means for causing said contacts to move into engagement with a snap action.

9. In combination with a dynamoelectric unit, a temperature responsive snap acting device responsive to centrifugal force for controlling an electric circuit in response to the speed of rotation of said unit, comprising; a support rotatable with said unit, a bimetallic cantileverly mounted spring blade carried by said support and rotatable with said unit, and a movable contact carried by said blade and movable into engagement with a stationary contact when the combination of the speed of rotation and temperature of said unit exceeds a predetermined value, and means connected with said bi-metallic means for causing said contacts to move into engagement with a snap action.

10. In combination with a dynamoelectric unit, a temperature responsive, centrifugally responsive snap acting switch for controlling an electric circuit in response to the rotation of said unit, comprising; a support mountable on a rotating part of said unit, a bimetallic centrifugally responsive member cantileverly carried by said support, a movable contact carried by said member movable into engagement with a stationary contact carried by said support when the rotation of said unit and temperature exceeds a predetermined value, and means connected with said bi-metallic means for causing said contacts to move into engagement with a snap action.

11. A centrifugal switch mechanism for use in combination with a dynamoelectric machine including a rotatable shaft; a support adapted to be mounted on and rotate with said shaft, a snap action switch mounted on said support and off-center with respect to said shaft, said switch including stationary and movable contacts operable to be snapped from closed to open circuit position, means responsive to centrifugal force caused by rotation of said support associated with said switch and adapted to actuate the same in response to predetermined changes in centrifugal force as determined by the speed of rotation of said support, and stop means for limiting the movement of the centrifugally responsive means.

References Cited in the file of this patent

UNITED STATES PATENTS

| | | |
|---|---|---|
| 1,632,565 | Schmidt | June 14, 1927 |
| 1,918,203 | Wise | July 11, 1933 |
| 2,286,053 | Bletz | June 9, 1942 |
| 2,557,208 | Thunberg et al. | June 19, 1951 |
| 2,558,223 | Reger | June 26, 1951 |
| 2,670,416 | Masheris et al. | Feb. 23, 1954 |
| 2,691,516 | Fischer | Oct. 12, 1954 |
| 2,736,855 | Howard | Feb. 28, 1956 |